United States Patent
Jerbi et al.

(10) Patent No.: US 7,289,824 B2
(45) Date of Patent: Oct. 30, 2007

(54) MOBILE COMMUNICATION TERMINAL

(75) Inventors: Belhassen Jerbi, Kirchheim (DE);
Josef Laumen, Hildesheim (DE);
Andreas Schmidt, Braunschweig (DE);
Markus Trauberg, Velchede (DE);
Sabine Van Niekerk, Salzgitter (DE)

(73) Assignee: Siemens Aktiengesellschaft, Munich (DE)

( * ) Notice: Subject to any disclaimer, the term of this patent is extended or adjusted under 35 U.S.C. 154(b) by 64 days.

(21) Appl. No.: 10/476,094

(22) PCT Filed: Mar. 15, 2002

(86) PCT No.: PCT/DE02/00940

§ 371 (c)(1),
(2), (4) Date: Oct. 24, 2003

(87) PCT Pub. No.: WO02/086800

PCT Pub. Date: Oct. 31, 2002

(65) Prior Publication Data

US 2004/0132490 A1    Jul. 8, 2004

(30) Foreign Application Priority Data

Apr. 24, 2001   (DE) ................... 101 20 067

(51) Int. Cl.
*H04M 1/00* (2006.01)
*G05B 19/00* (2006.01)

(52) U.S. Cl. ............... 455/556.1; 455/566; 455/556.2; 340/5.83

(58) Field of Classification Search ............ 455/556.1, 455/411, 410, 461; 713/186, 202; 382/124, 382/125, 115; 235/380, 382; 283/67; 345/173; 340/5.53

See application file for complete search history.

(56) References Cited

U.S. PATENT DOCUMENTS

| | | | | |
|---|---|---|---|---|
| 5,825,352 A | * | 10/1998 | Bisset et al. | 345/173 |
| 5,828,773 A | | 10/1998 | Setlak et al. | |
| 5,848,176 A | * | 12/1998 | Hara et al. | 382/124 |
| 5,872,834 A | * | 2/1999 | Teitelbaum | 379/93.03 |
| 5,933,515 A | * | 8/1999 | Pu et al. | 382/124 |
| 6,038,666 A | * | 3/2000 | Hsu et al. | 713/186 |
| 6,088,585 A | * | 7/2000 | Schmitt et al. | 455/411 |
| 6,141,436 A | * | 10/2000 | Srey et al. | 382/124 |
| 6,219,793 B1 | * | 4/2001 | Li et al. | 713/202 |
| 6,241,288 B1 | * | 6/2001 | Bergenek et al. | 283/67 |
| 6,298,230 B1 | * | 10/2001 | Schneider-Hufschmidt | 455/411 |
| 6,345,761 B1 | * | 2/2002 | Seelbach et al. | 235/380 |
| 6,484,260 B1 | * | 11/2002 | Scott et al. | 713/186 |
| 6,535,622 B1 | * | 3/2003 | Russo et al. | 382/124 |
| 6,546,122 B1 | * | 4/2003 | Russo | 382/125 |

(Continued)

FOREIGN PATENT DOCUMENTS

CA     2273560     1/2000

(Continued)

*Primary Examiner*—Joseph Feild
*Assistant Examiner*—Kiet Doan
(74) *Attorney, Agent, or Firm*—Bell, Boyd & Lloyd

(57) ABSTRACT

A mobile communication terminal is molded having an operating surface including a display and a keyboard. A biometric sensor is arranged on the operating surface, for scanning and identifying a fingerprint. The inventive communication terminal can be controlled especially according to the orientation of the fingerprint, which is detected via the sensor.

7 Claims, 1 Drawing Sheet

U.S. PATENT DOCUMENTS

| | | | |
|---|---|---|---|
| 6,751,734 B1 * | 6/2004 | Uchida | 713/186 |
| 6,757,410 B1 * | 6/2004 | Nakashima | 382/124 |
| 6,792,287 B1 * | 9/2004 | Tuomela et al. | 455/556.1 |
| 6,879,821 B2 * | 4/2005 | Murakami | 455/411 |
| 6,931,538 B1 * | 8/2005 | Sawaguchi | 713/186 |
| 2003/0005337 A1 * | 1/2003 | Poo et al. | 713/202 |

FOREIGN PATENT DOCUMENTS

| | | |
|---|---|---|
| DE | 196 00 209 | 7/1997 |
| DE | 200 08 345 | 9/2000 |
| DE | 100 25 017 | 12/2000 |
| DE | 199 43 117 | 3/2001 |
| EP | 0 330 767 | 9/1989 |
| EP | 0 593 386 | 4/1994 |
| EP | 0 736 836 | 10/1996 |
| EP | 0 905 646 | 3/1999 |
| EP | 0 932 117 | 7/1999 |
| WO | WO 99/28701 | 6/1999 |

* cited by examiner

MOBILE COMMUNICATION TERMINAL

BACKGROUND OF THE INVENTION

The present invention relates to a mobile communication terminal. Such devices normally have an operating surface on which a display and a keyboard are arranged. The highly extensive operating functions are typically organized in extensive menu structures. The menu structure does not now take into account the frequency with which a function is used; i.e., frequently used operating functions must be called up in the same complex manner as less frequently used functions. Communication terminals are usually assigned to a specific user and, accordingly, have a login function with which the authorized user logs on using a PIN. However, logging on in this way is not normally necessary and so there is a risk that the PIN will be forgotten.

The document WO 99 28701 A discloses a mobile communication terminal with an operating surface on which a biometric sensor for identifying a fingerprint is arranged. Furthermore, the document EP-A-0 736 836 discloses the concept of determining the orientation of a fingerprint to be verified in order to improve the quality of identification. The document U.S. Pat. No. 5,828,773 discloses a device with a fingerprint sensor wherein, the device determines the actual position of the fingerprint on the fingerprint sensor relative to a required position.

An object of the present invention is to propose a communication terminal having a simplified operation.

SUMMARY OF THE INVENTION

Such object is achieved according to an embodiment of the present invention wherein a biometric sensor for identifying a fingerprint is disposed on the operating panel of a mobile communication device. The sensor, which also may be integrated into the display in a space-saving manner, scans the ridges of a fingertip with high resolution and identifies, for example, the characteristic fingerprint structure assigned to a specific finger of an authorized person by comparing it with a sample stored in the device. The user, therefore, no longer logs on by entering a PIN, but merely by placing a certain finger on the sensor surface.

In an embodiment, the sensor has an extended surface which allows a finger to be placed in different positions. Such a sensor is designed so that it recognizes the different positions. As such, the position or orientation of the fingerprint can be used for authorization purposes as well as the fingerprint itself. Finally, the sensor is designed such that it recognizes the time interval between successive finger scanning operations. This provides a further combination option that does not just relate to authorization verification. This is because the sensor also can be used as an input device. A fingerprint, a position, an orientation or a time interval can be used in any combination (preferably to be defined by the user) in order to operate the device. In other words, functions such as calling a specific menu, setting a device function, or similar can be done via the sensor.

Additional features and advantages of the present invention are described in, and will be apparent from, the following Detailed Description of the Invention and the Figures.

DETAILED DESCRIPTION OF THE INVENTION

Figure 1:
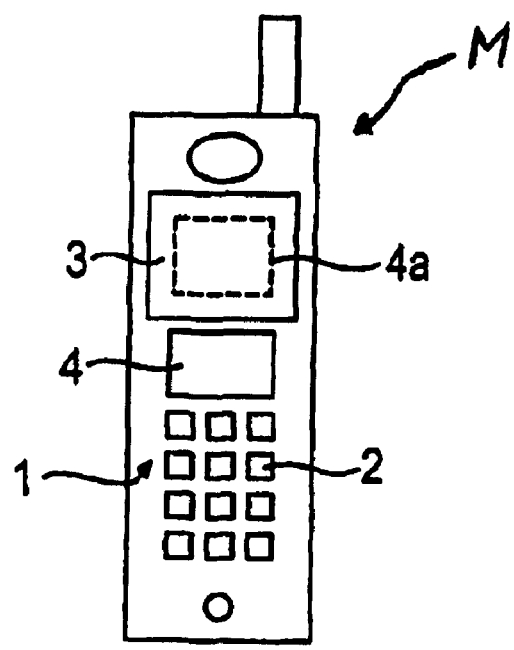
FIG. 1 shows a top view of a communication terminal.

The communication terminal M shown in FIG. 1 includes an operating panel 1 on which are arranged a keyboard 2, a display 3 and a biometric sensor 4. The sensor 4—is, for example, rectangular and is arranged between the display 3 and the keyboard 2. In an alternative embodiment, the sensor 4a is integrated in the display 3 in a space-saving manner. The sensor 4 is designed such that it can register the orientation 5 (FIG. 2) and the position of the finger as well as the sample of the fingertip or the fingerprint.

In this way (i.e., by registering a fingerprint in order to derive control instructions for the communication terminal), it is possible for the communication terminal to be controlled irrespectively of the ambient noise level, and for it to be done, for example, in a quiet environment such as meetings.

Particularly in the case of communication terminals in the form of mobile telephones having small dimensions, the sensor 4 or 4a may be small enough for just one fingerprint and its orientation to be registered.

However, it is also possible, with larger communications terminals, for the surface of the sensor 4 or 4a to be designed such that a finger may be placed and registered in different positions. This enables a greater degree of control flexibility to be achieved.

Firstly, for the purpose of verifying authorization during the commissioning of the communication terminal M, a fingerprint of the user may be registered using one of the sensors 4 or 4a. The orientation and/or the position of a finger or fingerprint may be registered as an authorization feature on the sensor 4 or 4a instead of or in addition to the actual fingerprint sample.

Figure 2:
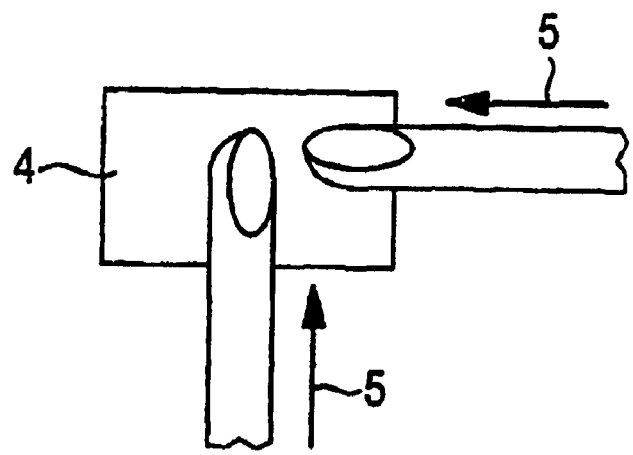
FIG. 2 is a schematic diagram showing the scanning of two fingers.

As well as authorization verification, a fingerprint or its registration also may be used to control the communication terminal. For example, in a standby mode, in which the communication terminal awaits control instructions from a user, such as the entry of a telephone number or the calling of a menu, by registering a fingerprint in a specific orientation, such as vertically with the fingertip pointing upward as shown in FIG. 2, it is possible to browse through a list of last dialed telephone numbers. As such, for example, each time the finger is pressed again onto the sensor 4 or 4a in the vertical orientation shown in FIG. 2, the aforementioned list is browsed through in an endless repetition to find a list entry, starting with the last dialed list entry and, for example, by pressing the finger in a horizontal orientation, as also shown in FIG. 2, a list entry can be selected and/or the corresponding telephone number dialed. It is also possible to select a list entry using the fingerprint of a different finger specifically assigned for that purpose, in which case the orientation of this finger with regard to the sensor 4 or 4a also can be used as a selection criterion.

In addition to the possibility of browsing or scrolling through a list of telephone numbers that already have been dialed, by registering a fingerprint or its orientation it is also possible to browse through a list of already dialed or frequently required (and, therefore, preset) functions or applications, such as an application for creating an SMS (Short Message Service) message or for extending the communication terminal's own telephone directory, etc. The list of applications also may be browsed in the same way as the list of telephone numbers or by using keys on the keyboard 2 (i.e., at least one key for browsing through the list and possibly one key for selecting the list entry).

It is also possible, by registering a fingerprint and/or its orientation (where the communication terminal is a telephone), to accept or reject calls. If the user of the communication terminal receives a call signal, such user may, for example, accept the call by placing a certain finger in a vertical orientation, as shown in FIG. 2, or reject the call by placing a certain finger in a horizontal orientation, as also shown in FIG. 2.

It is also possible, by registering a fingerprint and/or its orientation, to navigate through complex menu structures which have, in particular, been called up beforehand via a fingerprint and/or its orientation. Thus, a vertically oriented finger pointing upward or downward can be used to navigate through the individual menu items, while a finger pointing to the right is used to select a menu item and a finger pointing to the left is used to return to a higher menu level. Control processes for menus, as well as lists and applications, can be executed accordingly by registering different fingers (according to the functions to be executed) or by registering the time interval between successive finger scanning operations by the sensor 4 (4a) of one or more fingers.

In addition to controlling the communication terminal, the registered fingerprints and/or their orientation, in particular of several fingers, may be used for inputting characters. This is based on the assumption that a user might wish to use the five fingers of one hand to input the digits of a telephone number. Thus, for example, the fingers from the thumb to the little finger, and/or their imprint in a vertical orientation as shown in FIG. 2, represent the digits "1", "2", "3", "4", and "5", while the same fingers in a horizontal orientation, as also shown in FIG. 2, represent the digits "6", "7", "8", "9" and "0". After selecting a special application for inputting telephone numbers via fingerprints, the individual fingers described above are placed on the sensor in a specific orientation in order to input the digits of the telephone number. Finally, it is possible (for example, by leaving the finger representing the last digit on the sensor for longer than a preset—interval) to begin dialing the telephone number in order to set up a communication connection. If the fingerprint and/or its orientation are precisely registered, it is also possible to identify not only a horizontal or vertical finger orientation, but also "diagonal" orientations lying at an angle between "horizontal" and "vertical". Thus, a fingerprint of a finger combined with its orientation may be assigned a great many—characters so that, for example, letters may be entered as well as digits. It is also possible, for example, instead of inputting a telephone number directly, to place in succession the finger or fingers that correspond to an abbreviated dialing combination on the sensor (in the correct orientation) in order to cause the telephone number to be dialed for the purpose of setting up a communication connection.

In the case of sensors with an extended surface, it is also possible to register two or more fingerprints at once, in which case the communication terminal also can be controlled by combining two or more specific fingerprints that are registered by the sensor. Furthermore, if the orientation of the relevant finger combination is again used in addition to the actual fingerprint sample as an additional control criterion, this results in a great number of control commands that may be implemented by registering the fingerprints.

In the case of sensors with an extended surface it is also possible to register one or more fingerprints in different positions so as to execute specific control procedures depending on the position of the registered fingerprints. In a standby mode, for example, placing a finger vertically on the right-hand section of the sensor surface may open an application that shows a list of last dialed telephone numbers, while placing a finger vertically on the right-hand section of the sensor surface may open an application that shows a list of last selected functions.

As shown in FIG. 1, the communication device may be designed as a mobile radio device or mobile telephone; in particular, one conforming to the GSM (Global System for Mobile Communication) or the UMTS (Universal Mobile Telecommunication Service) standard. It also may, however, be designed as a (small) portable computer, such as an organizer or a PDA (personal digital assistant). It is also possible for the communication terminal to be designed as a communication terminal to be worn on the arm, such as a watch or wrist phone.

Indeed, although the present invention has been described with reference to specific embodiments, those of skill in the art will recognize that changes may be made thereto without departing from the spirit and scope of the present invention as set forth in the hereafter appended claims.

The invention claimed is:

1. A mobile communication terminal, comprising:
   an operating surface; and
   a biometric sensor for identifying and registering a fingerprint impressed on the operating surface in a plurality of different orientations having different angles relative to the operating surface and representative of different functions, wherein the biometric sensor registers at least one of the plurality of different orientations, enters a specific control instruction into the mobile communication terminal according to the registered orientation of the finger, and transmits the control instruction to the mobile communication terminal when a fingerprint is identified as being positioned in the registered orientation, wherein
   the biometric sensor has an extended surface which permits a finger to be placed in different position.

2. The mobile communication terminal as claimed in claim 1, further comprising a display in which the biometric sensor is integrated.

3. The mobile communication terminal as claimed in claim 1, wherein the biometric sensor registers a time interval between successive scanning operations of at least one finger.

4. The mobile communication terminal as claimed in claim 1, wherein the biometric sensor is used as an input device for operating the mobile communication terminal.

5. The mobile communication terminal as claimed in claim 1, wherein the control instruction entered through the biometric sensor is used for one of controlling a menu structure shown on the operating surface and entering characters.

6. A method for operating a mobile communication terminal, comprising:
   receiving a fingerprint impression on an operating surface of a biometric sensor determining one of a plurality of different orientations having different angles of the impressed fingerprint relative to an operating surface of the mobile communication terminal and representative of different functions;
   registering the determined orientation and assigning a control instruction for the mobile communication terminal based on the registered orientation;
   receiving a second fingerprint impression on the operating surface;
   determining whether the second fingerprint impression has an orientation that matches the registered orientation, and transmitting the control instruction to the mobile communication terminal if a match is determined.

7. A method for operating a mobile communication device, comprising:
   registering a plurality of different orientations having different angels of a fingerprint relative to the operating surface of the mobile communication device and representative of different functions;
   assigning a respective control function to each registered orientation;
   processing a fingerprint impressed on the operating surface of the mobile communication device via a biometric sensor to determine the orientation of the impressed fingerprint;
   determining if the impressed fingerprint orientation matches a registered orientation; and
   executing the control function assigned to the orientation to control operation of the mobile communication device.

* * * * *